(12) United States Patent
Schneider et al.

(10) Patent No.: US 8,813,928 B2
(45) Date of Patent: *Aug. 26, 2014

(54) ALTERNATOR ISOLATING DECOUPLER

(75) Inventors: Dean Schneider, Washington, MI (US); Peter Ward, Farmington Hills, MI (US); Alexander Serkh, Troy, MI (US); Imitiz Ali, Lathrup Village, MI (US); John Harvey, Novi, MI (US)

(73) Assignee: The Gates Corporation, Denver, CO (US)

( * ) Notice: Subject to any disclaimer, the term of this patent is extended or adjusted under 35 U.S.C. 154(b) by 59 days.

This patent is subject to a terminal disclaimer.

(21) Appl. No.: 13/273,349

(22) Filed: Oct. 14, 2011

(65) Prior Publication Data

US 2013/0092501 A1  Apr. 18, 2013

(51) Int. Cl.
*F16D 47/04* (2006.01)
*F16H 55/36* (2006.01)
*F16D 41/20* (2006.01)

(52) U.S. Cl.
CPC ........... *F16D 41/206* (2013.01); *E05Y 2201/49* (2013.01); *E05Y 2800/21* (2013.01)
USPC .......................................... 192/41 S; 474/94

(58) Field of Classification Search
USPC ............ 474/94, 171; 464/40; 192/41 S, 81 C, 192/48.92
See application file for complete search history.

(56) References Cited

U.S. PATENT DOCUMENTS

| | | | | |
|---|---|---|---|---|
| 2,481,037 A * | 9/1949 | Pringle | ........................ | 254/340 |
| 4,610,339 A * | 9/1986 | Ciolli | ........................ | 192/48.92 |
| 4,763,764 A * | 8/1988 | Smith | ........................ | 192/41 S |
| 5,064,038 A | 11/1991 | Batchelder | | |
| 5,139,463 A | 8/1992 | Bytzek et al. | | |
| 5,156,573 A | 10/1992 | Bytzek et al. | | |
| 5,775,619 A * | 7/1998 | Tabellini | ........................ | 242/372 |
| 6,044,943 A | 4/2000 | Bytzek et al. | | |
| 6,083,130 A | 7/2000 | Mevissen et al. | | |
| 7,153,227 B2 | 12/2006 | Dell et al. | | |
| 7,207,910 B2 | 4/2007 | Dell et al. | | |
| 7,591,357 B2 * | 9/2009 | Antchak et al. | ............... | 192/55.5 |
| 7,618,337 B2 | 11/2009 | Jansen et al. | | |
| 7,712,592 B2 | 5/2010 | Jansen et al. | | |
| 7,766,774 B2 * | 8/2010 | Antchak et al. | .................. | 474/74 |
| 7,975,821 B2 * | 7/2011 | Antchak et al. | ............... | 192/55.1 |
| 8,006,819 B2 | 8/2011 | Dell et al. | | |
| 8,286,771 B2 * | 10/2012 | Takada et al. | ................ | 192/41 S |
| 2006/0144664 A1 * | 7/2006 | Antchak et al. | ............... | 192/41 S |
| 2009/0176608 A1 * | 7/2009 | Jansen et al. | ...................... | 474/74 |
| 2010/0089714 A1 * | 4/2010 | Takada et al. | .................... | 192/43 |
| 2010/0252387 A1 * | 10/2010 | Antchak et al. | ............... | 192/54.2 |
| 2012/0298474 A1 * | 11/2012 | Ward et al. | .................... | 192/41 S |

FOREIGN PATENT DOCUMENTS

GB         2443833 A  *  5/2008  .............. F16H 25/24
WO   2011072391 A1      6/2011

* cited by examiner

*Primary Examiner* — Troy Chambers
*Assistant Examiner* — Lillian Nguyen
(74) *Attorney, Agent, or Firm* — Jeffrey A. Thurnau, Esq.; Paul N. Dunlap, Esq.

(57) ABSTRACT

An alternator isolating decoupler comprising an alternator shaft, a one-way clutch engaged with the alternator shaft, a first wrap spring releasably engaged with the one-way clutch, a second wrap spring releasably engaged with the one-way clutch, the second wrap spring arranged in parallel with the first wrap spring, the first wrap spring and the second wrap spring in nested relation, the first wrap spring and the second wrap spring each having an end releasably engagable with an end cap, the end cap fixedly connected to an outer housing, the first wrap spring and the second wrap spring each engaged in series with a torsion spring, the torsion spring engaged with the outer housing, and the outer housing engaged with an alternator rotor.

15 Claims, 3 Drawing Sheets

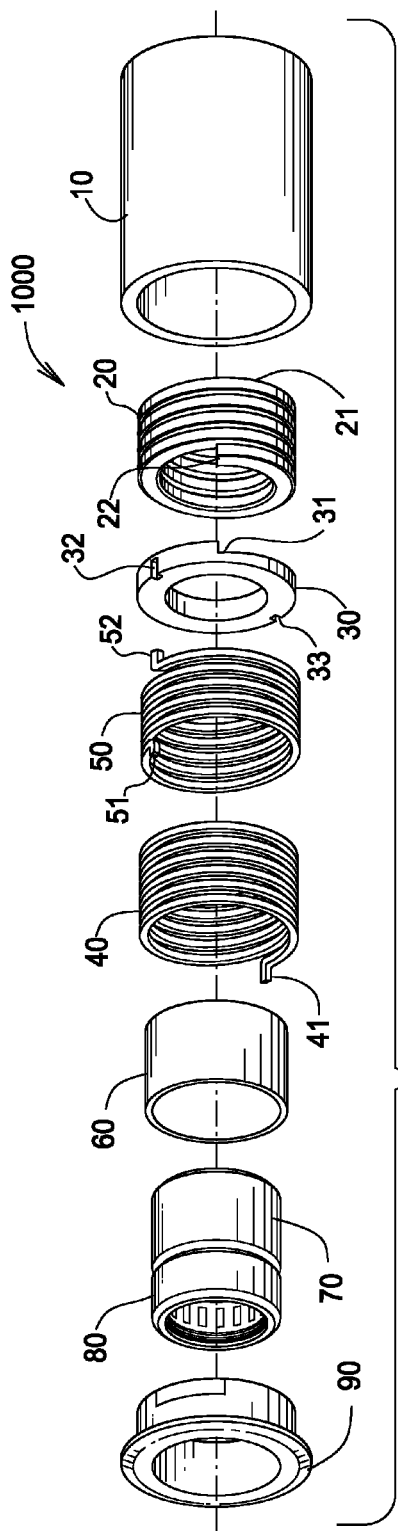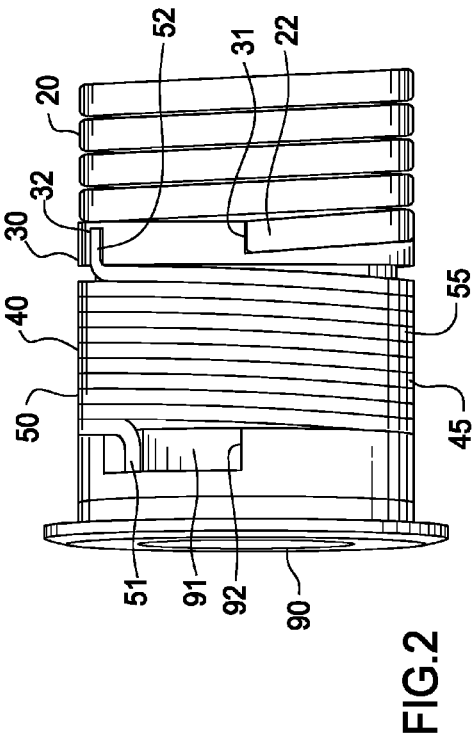

ALTERNATOR ISOLATING DECOUPLER

FIELD OF THE INVENTION

The invention relates to an alternator isolating decoupler, and more particularly, an alternator isolating decoupler having a first wrap spring and a second wrap spring in parallel, each in turn arranged in series with a torsion spring and each wrap spring being releasably engaged with a one way clutch and releasably engaged with an alternator rotor.

BACKGROUND OF THE INVENTION

Belt driven accessory systems are in common use to transfer power from an internal combustion engine crankshaft to accessory components typically including an alternator (generator), water pump, oil pump (power steering), air conditioning compressor (via electromechanical clutch). These components are usually fixed position mounted and utilize an automatic belt tensioner to provide constant belt tension and take-up of belt slack.

Internal combustion engines generate rotating power at the crankshaft only when a combustion event occurs. This, in effect, is a pulsed system whereby the closer the spacing of the combustion events, the smoother the rotational consistency of the engine. For each combustion stroke, the crankshaft will exhibit acceleration, then deceleration, until the next combustion stroke. In general, the slower the rotation of the engine, and the lesser number of cylinders (combustion events per revolution of crankshaft) tends to increase the magnitude of the pulsing effect.

In terms of the serpentine belt system, the crankshaft pulses are transferred to the belt as fluctuations in velocity. The velocity fluctuations of the engine are thus transferred to all the driven components in the system. Dynamic belt tension fluctuation is generated by the velocity fluctuation. Without considering the dynamic loading of the accessory components and consequent tension effects, it is obvious that the driven inertias will generate dynamic tensions as the belt continuously attempts to accelerate and decelerate such components.

Where the engine is smaller, four or five cylinders, and in the lowest speed ranges (idling area) the dynamic tension fluctuation is at the highest magnitude. The magnitude can be further increased by technological differences that serve to lower the engine rotating inertia (dual mass fly wheel) or increase the instantaneous acceleration (diesel, higher compression, etc.). Operating conditions can also have a significant effect, for instance, "lugging" where the engine is running below its ideal minimum speed (idle) at high power levels that attempt to increase the speed back to idle.

Under these circumstances, the dynamic belt loading can be so great that the belt tensioner cannot accommodate all the dynamic fluctuations. The results can include belt noise, belt slippage and forced vibration of the belt, tensioner and accessory components. Ultimately, durability is compromised.

It is possible to resolve this problem using a torsional isolator at the crankshaft, provided it has low stiffness. Such conventional torsional isolators have been employed for many years, but are bulky, costly, heavy, and display limited effectiveness. This limited effectiveness is generally the result of the drive having to be designed to carry the full power capability of the system, while rarely ever requiring the same. Thus, torsional isolators are typically too stiff.

Each of the noted functions has different engineering requirements for optimizing the system. For example, the resilient coupling function would optimally have a greater spring rate (a stiffer spring) than the spring rate utilized for performing the coupling/decoupling function. Optimally, a higher spring rate is desirable for transmitting driven rotational movement of the alternator pulley to the hub structure in order to accommodate the relatively high torsional forces, while a lower spring rate is desirable for the de-coupling function so that less force is exerted and thus less frictional wear and heat is generated by the mechanism during the de-coupling or overrun condition. Increasing the spring rate of the mechanism to accommodate the torsion transmitting function would be to the detriment of the coupling/de-coupling function, while decreasing the spring rate to accommodate the coupling/de-coupling function would be to the detriment of the torsion transmitting function.

Representative of the art is U.S. Pat. No. 6,083,130 which discloses a serpentine belt drive system for an automotive vehicle comprising a drive assembly including an internal combustion engine having an output shaft with a driving pulley thereon rotatable about a driving pulley axis. A sequence of driven assemblies each has a driven pulley rotatable about an axis parallel with the driving pulley axis and a serpentine belt mounted in cooperating relation with the driving pulley and with the driven pulleys in a sequence which corresponds with the sequence of the driven assemblies when related to the direction of movement of the belt to cause said driven pulleys to rotate in response to the rotation of the driving pulley. The sequence of driven assemblies includes an alternator assembly including an alternator shaft mounted for rotation about a shaft axis. A hub structure is fixedly carried by the alternator shaft for rotation therewith about the shaft axis. A spring and one-way clutch mechanism couples the alternator pulley with the hub structure. The spring and one-way clutch mechanism comprises a resilient spring member separately formed from and connected in series with a one-way clutch member. The resilient spring member is constructed and arranged to transmit the driven rotational movements of the alternator pulley by the serpentine belt to the hub structure such that the alternator shaft is rotated in the same direction as the alternator pulley while being capable of instantaneous relative resilient movements in opposite directions with respect to the alternator pulley during the driven rotational movement thereof. The one-way clutch member is constructed and arranged to allow the hub structure and hence the alternator shaft to rotate at a speed in excess of the rotational speed of the alternator pulley when the speed of the engine output shaft is decelerated to an extent sufficient to establish the torque between the alternator pulley and the hub structure at a predetermined negative level.

What is needed is an alternator isolating decoupler having a first wrap spring and a second wrap spring in parallel, each in turn arranged in series with a torsion spring and each wrap spring being releasably engaged with a one way clutch and releasably engaged with an alternator rotor. The present invention meets this need.

SUMMARY OF THE INVENTION

The primary aspect of the invention is to provide an alternator isolating decoupler having a first wrap spring and a second wrap spring in parallel, each in turn arranged in series with a torsion spring and each wrap spring being releasably engaged with a one way clutch and releasably engaged with an alternator rotor.

Other aspects of the invention will be pointed out or made obvious by the following description of the invention and the accompanying drawings.

The invention comprises an alternator isolating decoupler comprising an alternator shaft, a one-way clutch engaged with the alternator shaft, a first wrap spring releasably engaged with the one-way clutch, a second wrap spring releasably engaged with the one-way clutch, the second wrap spring arranged in parallel with the first wrap spring, the first wrap spring and the second wrap spring in nested relation, the first wrap spring and the second wrap spring each having an end releasably engagable with an end cap, the end cap fixedly connected to an outer housing, the first wrap spring and the second wrap spring each engaged in series with a torsion spring, the torsion spring engaged with the outer housing, and the outer housing engaged with an alternator rotor.

BRIEF DESCRIPTION OF THE DRAWINGS

The accompanying drawings, which are incorporated in and form a part of the specification, illustrate preferred embodiments of the present invention, and together with a description, serve to explain the principles of the invention.

FIG. 1 is an exploded view of the inventive device.

FIG. 2 is a view of the isolating decoupler with the outer housing removed.

DETAILED DESCRIPTION OF THE PREFERRED EMBODIMENT

Figure 3:
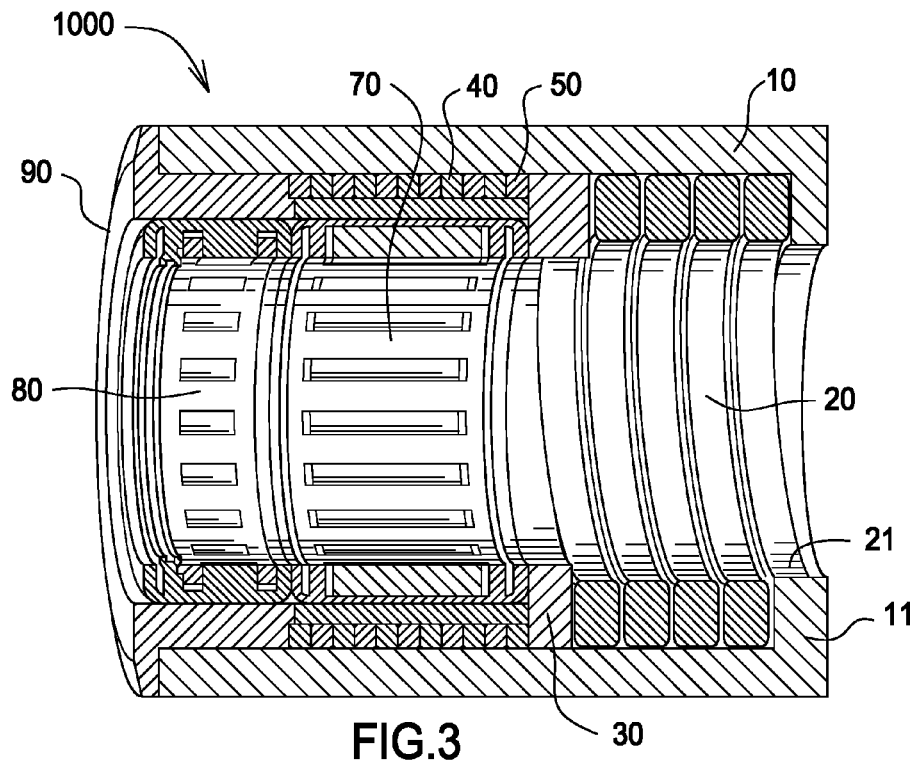
FIG. 3 is a detail of FIG. 4.

The inventive device is for use on belt driven accessory system typically associated with vehicle engines. The accessory system may comprise an alternator, power steering pump, air conditioning compressor and water pump. The accessories are driven by a serpentine belt that is trained between each of the devices. The device having the highest inertia is typically the alternator.

FIG. 1 is an exploded view of the inventive device. The inventive isolator decoupler 1000 comprises an outer housing 10. In the preferred embodiment an alternator rotor is press fit onto the outer housing 10. The device 100 and outer housing 10 are completely contained within an alternator case 140, see FIG. 4.

Disposed within the outer housing 10 is a torsion spring 20. An end 21 of the torsion spring is engaged with the outer housing at a stop 11, see FIG. 3. Torsion spring 20 has a substantially rectangular cross section, see FIG. 3. The rectangular cross section allows a smaller axial length for the volutes. Torsion spring 20 preferably does not contact rotor 100.

Engaged with an other end 22 of the torsion spring is a torsion spring driver member 30. The torsion spring driver member 30 engages spring receiving portion 31, but is not otherwise fixed to either the outer housing 10 or alternator rotor 100. In effect it "floats" between the torsion spring 20 and both wrap springs 40 and 50.

Engaged with the torsion spring driver 30 is an end 41 and end 51 of both wrap springs 40 and 50 respectively. End 52 engages a spring receiving portion 32. End 42 engages a spring receiving portion 33.

Figure 5:
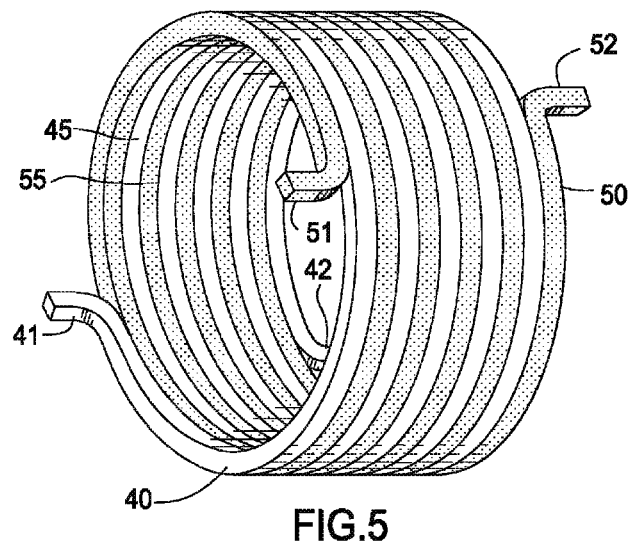
FIG. 5 is a perspective view of the wrap springs.

The volutes of first wrap spring 40 and second wrap spring 50 are in nested relation, meaning, the volutes of each wrap spring are arranged adjacent to each other in an alternating manner, see FIG. 5. The first wrap spring and second wrap spring are operationally arranged in parallel. In a normal operating condition the first wrap spring 40 and second wrap spring 50 frictionally grip the exterior of the clutch carrier 60. In operation first wrap spring 40 and second wrap spring 50 transmit torque in the spring winding direction from the one-way clutch 70 to the torsion spring 20. Torsion spring 20 is loaded in the unwinding direction. Torsion spring 20 is wound in a direction opposite that of the wrap springs 40 and 50. The parallel combined wrap springs 40, 50 are arranged in series with the torsion spring 20.

Since each wrap spring is in a loaded condition on the clutch carrier 60 neither wrap spring slips relative to the clutch carrier during normal operation. Applying torque to the system causes the wrap springs 40, 50 to wind tighter around the clutch carrier 60 further eliminating any potential to slip.

Clutch carrier 60 is press fit upon an outer race of one way clutch 70. One way clutch 70 is press fit upon an alternator shaft 100. Needle bearing 80 also engages the alternator shaft 100, see FIG. 4. End cap 90 engages the needle bearing and the outer housing.

In operation, a belt (not shown) engages pulley 120. Pulley 120 is fixed to an end of alternator shaft 100. One way clutch 70 is driven by the alternator shaft 100. One way clutch 70 in turn drives the clutch carrier 60 which in turn drives the first wrap spring 40 and second wrap spring 50. The first and second wrap springs drive the torsion spring driver 30. Torsion spring driver 30 drives torsion spring 20 which drives the outer housing 10. Outer housing 10 drives the alternator rotor 110. Torsion spring 20 is driven in the unwinding direction, meaning, torque will tend to unwind and expand the torsion spring as it is applied.

An alternator 130 is known in the art and is configured as any known alternator, except in this embodiment wherein the shaft 100 would normally be driving the rotor 110 directly, instead shaft 100 drives the isolating decoupler 1000 which in turn drives the alternator rotor 110. The inventive device represents a significantly simpler and more efficient configuration over the prior art by fully integrating the isolating decoupler into the alternator assembly.

To minimize the physical size of the torsion spring 20 and one-way clutch 70, it is preferable to have an overload feature that prevents torque in excess of a predetermined maximum to be transmitted to the torsion spring 20 and/or one-way clutch 70. Excessive torque applied to either the torsion spring or one-way clutch could cause either component to fail prematurely.

The instant invention provides a slip feature that truncates any excessive torque applied to the device thus lowering the maximum torque applied to the elements within the device. This allows for optimization of the components based upon a reduced torque assumption which avoids an overdesign situation simply to handle intermittent peak torque events.

It is known that the rated peak torque of an alternator is less than the peak torque observed when starting the engine. For example, a typical automotive alternator will have a rated peak torque of 12 Nm, an inertia of 0.00030 kg m$^2$, and an acceleration rate at the alternator of 100,000 rad/s$^2$ during engine starting. Using Equation 1 at engine start-up the device must be able to handle a peak torque of 30 Nm, but will not see such a high torque during all other operating conditions.

$$T = I\omega^2 \qquad \text{Equation 1}$$

Where:

T=torque

I=alternator inertia $\omega^2$=acceleration rate

To eliminate the need to use a torsion spring and one-way clutch that can handle the peak starting torque, the inventive device uses the first wrap spring 40 and second wrap spring 50 that are decoupled above a peak rated torque.

FIG. 2 is a view of the isolating decoupler with the outer housing removed. End 41 and end 51 of the wrap springs 40 and 50 respectively engage pocket 91 and pocket 93 respectively in the end cap 90, see FIG. 6. Pocket 91 and pocket 93 are equally spaced on an outer circumference of the end cap 90. This engagement allows rotational movement of the wrap spring 40 and wrap spring 50 relative to the end cap 90. End cap 90 is fixedly attached to the outer housing 10.

In operation, end 41 and end 51 of the wrap spring 40 and wrap spring 50 respectively move within pockets 91 and 93, which may include moving toward face 92 and face 94 as the torque applied to the device increases. End 41 and end 51 each move within pocket 91 and pocket 93 respectively as torque is transmitted through the device. The applied torque unwinds torsion spring 20. The position of end 41 and end 51 fluctuates within each pocket respectively during normal operation.

When a predetermined peak torque is reached, end 41 and end 51 makes contact with face 92 and face 94 respectively. If the torque continues to increase, each face 92 and face 94 forces each wrap spring end 41 and end 51 to partially unwind thereby partially or progressively releasing or decoupling each wrap spring 40 and wrap spring 50 from the clutch carrier 60. This allows the first wrap spring 40 and second wrap spring 50 to rotate relative to the clutch carrier 60 and thus limit the maximum torque imposed upon one way clutch 70 and torsion spring 20.

Such relative rotation will temporarily decouple the shaft 100 from the alternator rotor 110. For example, when the torque at start up exceeds the predetermined maximum and the wrap springs are allowed to rotate relative to the clutch carrier, the speed of the alternator pulley temporarily exceeds the speed of the alternator rotor and the torque through the clutch and spring is limited to the predetermined maximum. One way clutch 70 declutches when the alternator rotor speed exceeds that of the alternator pulley. This allows the alternator rotor to rotate faster than the alternator shaft allowing the alternator inertia to be decoupled from the belt drive. This device represents an improvement over the prior art wherein a decoupler would decouple the pulley from the shaft, instead, in the inventive device the rotor decouples from the shaft.

Figure 4:
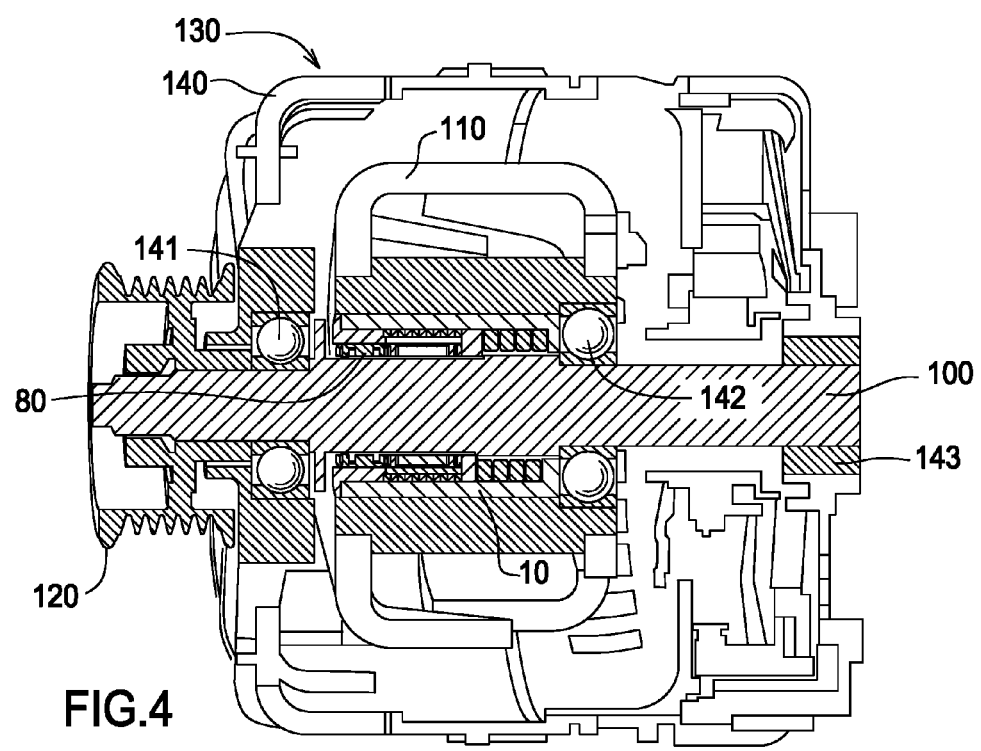
FIG. 4 is a cross sectional view of the device in an alternator.

FIG. 3 is a detail of FIG. 4. The inventive device 1000 comprises a simple, cartridge design for easy use in an alternator or other driven accessory device.

FIG. 4 is a cross sectional view of the device in an alternator. Device 1000 fits between the rotor 110 and shaft 100, all within the alternator case 140. The alternator case can be any known in the art Rotor 110 is mounted directly to the outer housing 10 of the device 1000, as opposed to prior art decouplers which are disposed at either end of the shaft 100, between the shaft and a pulley. The inventive device decreases the overall length of shaft 100 and thereby the overall length of the alternator. This in turn reduces the amount of space required by the alternator on an engine.

Shaft 100 rotates in bearings 141, 143. Further, alternator rotor 110 rotates on bearing 80 and on bearing 142. Bearings 141, 142 are preferably ball bearings, however, any known in the art including needle or sleeve bearings will work as well.

FIG. 5 is a perspective view of the wrap springs. Each volute 45 and volute 55 of each wrap spring 40, 50, is arranged in an adjacent alternating manner. This can also be referred to as a "nested" arrangement. Wrap spring 40 and wrap spring 50 are also in parallel.

Figure 6:
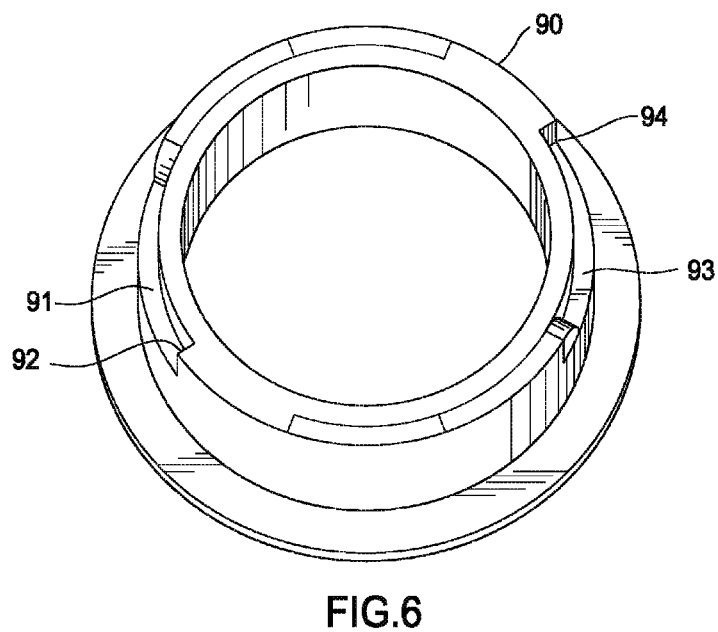
FIG. 6 is a detail of the end cap.

FIG. 6 is a detail of the end cap. End cap 90 comprises pockets 91, 93 for receiving ends 51, 41 of each wrap spring respectively. The pockets are preferably disposed 180° from each other on the circumference of the end cap. End cap 90 also serves as a dust seal to prevent debris from entering the device.

Although a form of the invention has been described herein, it will be obvious to those skilled in the art that variations may be made in the construction and relation of parts without departing from the spirit and scope of the invention described herein.

We claim:

1. An alternator isolating decoupler comprising:
    an alternator shaft;
    a one-way clutch engaged with the alternator shaft;
    a first wrap spring releasably engaged with the one-way clutch;
    a second wrap spring releasably engaged with the one-way clutch;
    the second wrap spring arranged in parallel with the first wrap spring;
    the first wrap spring and the second wrap spring in nested relation;
    the first wrap spring and the second wrap spring each having an end releasably engagable with an end cap, the end cap fixedly connected to an outer housing;
    the first wrap spring and the second wrap spring each engaged in series with a torsion spring;
    the torsion spring engaged with the outer housing; and
    the outer housing engaged with an alternator rotor.

2. The alternator isolating decoupler as in claim 1 further comprising a clutch carrier disposed between the first wrap spring and the second wrap spring and the one-way clutch.

3. The alternator isolating decoupler as in claim 1, wherein the end cap comprises a circumferential pocket for receiving an end of the first wrap spring and an end of the second wrap spring.

4. The alternator isolating decoupler as in claim 1 further comprising a torsion spring driver member disposed between the first wrap spring and the second wrap spring and the torsion spring.

5. The alternator isolating decoupler as in claim 1 wherein the end cap is engaged with a bearing, the bearing engaged with the alternator shaft.

6. An alternator isolating decoupler comprising:
    an alternator shaft;
    a one-way clutch engaged with the alternator shaft;
    a first spring and a second spring arranged in parallel;
    the first spring and second spring releasably engaged with the one-way clutch;
    the first spring and the second spring each having an end releasably engagable with an end cap, the end cap fixedly connected to an outer housing;
    the first spring and the second spring engaged in series with a torsion spring;
    the torsion spring engaged with the outer housing; and
    the outer housing engaged with an alternator rotor.

7. The alternator isolating decoupler as in claim 6, wherein the first spring and second spring are in nested relation.

8. The alternator isolating decoupler as in claim 6, wherein the first spring and second spring are loaded in a winding direction.

9. The alternator isolating decoupler as in claim 6, wherein the torsion spring is loaded in an unwinding direction.

10. An alternator isolating decoupler comprising:
    an alternator shaft;
    a one-way clutch engaged with the alternator shaft;

a first spring and a second spring releasably engaged with the one-way clutch;

the first spring and the second spring each having an end releasably engagable to an outer housing;

the first spring and the second spring engaged in series with a torsion spring;

the torsion spring engaged with the outer housing; and the outer housing engaged with an alternator rotor.

11. The alternator isolating decoupler as in claim 10, wherein the first spring and second spring are in nested relation.

12. The alternator isolating decoupler as in claim 10, wherein the first spring and second spring are loaded in a winding direction.

13. The alternator isolating decoupler as in claim 10, wherein the torsion spring is loaded in an unwinding direction.

14. The alternator isolating decoupler as in claim 10, wherein the first spring and second spring are in parallel.

15. The alternator isolating decoupler as in claim 10 further comprising a torsion spring driver member disposed between the first spring and the torsion spring.

\* \* \* \* \*